United States Patent
Simmons et al.

(10) Patent No.: US 9,868,265 B2
(45) Date of Patent: Jan. 16, 2018

(54) STRUCTURED THERMOPLASTIC IN COMPOSITE INTERLEAVES

(75) Inventors: Martin Simmons, Baldock (GB); Dana Blair, Bourne (GB); Steve Mortimer, St. Ives (GB)

(73) Assignee: Hexcel Composites, Limited, Duxford (GB)

( * ) Notice: Subject to any disclaimer, the term of this patent is extended or adjusted under 35 U.S.C. 154(b) by 35 days.

(21) Appl. No.: 13/166,646

(22) Filed: Jun. 22, 2011

(65) Prior Publication Data

US 2011/0294387 A1    Dec. 1, 2011

Related U.S. Application Data

(63) Continuation-in-part of application No. PCT/IB2011/000728, filed on Apr. 4, 2011.

(30) Foreign Application Priority Data

May 27, 2010 (GB) .................................. 1008884.7
Jun. 22, 2010 (GB) .................................. 1010445.3

(51) Int. Cl.
*C09J 7/00* (2006.01)
*C09J 5/06* (2006.01)
(Continued)

(52) U.S. Cl.
CPC ............... *B32B 5/022* (2013.01); *B32B 5/26* (2013.01); *B32B 2255/02* (2013.01);
(Continued)

(58) Field of Classification Search
CPC ......... B32B 5/02; B32B 5/26; B32B 2255/02; B32B 2255/205; B32B 2260/023; B32B 2262/0261; Y10T 428/31504
(Continued)

(56) References Cited

U.S. PATENT DOCUMENTS 3,867,221 A    2/1975 Chant
4,316,934 A    2/1982 Maier et al.
(Continued)

FOREIGN PATENT DOCUMENTS

DE    10149645 C1    1/2003
EP    366979    5/1990
(Continued)

OTHER PUBLICATIONS

English translation of JP H04-292909—Mitsubishi Rayon—Oct. 16, 1992.
(Continued)

*Primary Examiner* — Camie S Thompson
(74) *Attorney, Agent, or Firm* — W. Mark Bielawski; David J. Oldenkamp

(57) ABSTRACT

One or more layers of structured thermoplastic polymer, such as a light weight veil of thermoplastic polymer fibers, are located within the interleaf zone of laminates that are composed of fibrous layers and thermosetting resin. The thermoplastic veils are used in the interleaf zones as a replacement for thermoplastic toughening particles. The structured thermoplastic polymer may be coated with a conductive material to improve electrical conductivity through the laminate.

16 Claims, 4 Drawing Sheets

(51) Int. Cl.
*B32B 5/26* (2006.01)
*B32B 5/02* (2006.01)

(52) U.S. Cl.
CPC ... *B32B 2255/205* (2013.01); *B32B 2260/023* (2013.01); *B32B 2260/046* (2013.01); *B32B 2262/0261* (2013.01); *B32B 2605/18* (2013.01); *Y10T 428/269* (2015.01); *Y10T 428/31504* (2015.04); *Y10T 442/654* (2015.04)

(58) Field of Classification Search
USPC ... 442/11, 12, 52, 50, 58, 76, 324, 327, 333, 442/394; 156/306.6; 428/411.1, 339
See application file for complete search history.

(56) References Cited

U.S. PATENT DOCUMENTS

| | | | |
|---|---|---|---|
| 4,522,889 | A | 6/1985 | Ebneth et al. |
| 4,539,253 | A * | 9/1985 | Hirschbuehler et al. ..... 442/239 |
| 6,592,986 | B1 | 7/2003 | Hokatani et al. |
| 2002/0009935 | A1 | 1/2002 | Hsiao |
| 2003/0021976 | A1 | 1/2003 | Dublineau |
| 2005/0255766 | A1 | 11/2005 | Kruger et al. |
| 2006/0048881 | A1 | 3/2006 | Evans et al. |
| 2006/0252334 | A1 | 11/2006 | LoFaro et al. |
| 2008/0064279 | A1 * | 3/2008 | Browning ................ H01B 1/22 442/115 |
| 2008/0277057 | A1 | 11/2008 | Montgomery et al. |
| 2010/0160466 | A1 * | 6/2010 | Elabd et al. .................... 521/27 |
| 2010/0178487 | A1 | 7/2010 | Arai et al. |
| 2010/0228001 | A1 * | 9/2010 | Mortimer ..................... 528/322 |
| 2011/0159764 | A1 * | 6/2011 | Price et al. ................... 442/228 |

FOREIGN PATENT DOCUMENTS

| | | |
|---|---|---|
| EP | 0327142 | 1/1996 |
| EP | 1099541 A1 | 5/2001 |
| EP | 2053078 | 4/2009 |
| EP | 2067592 | 6/2009 |
| EP | 1473132 | 8/2010 |
| FR | 2937583 | 4/2010 |
| GB | 1335098 | 10/1973 |
| JP | H04-292909 | 10/1992 |
| JP | H08-259713 | 10/1996 |
| WO | 2000-58083 | 10/2000 |
| WO | WO2007-110617 | * 10/2007 |
| WO | 2008/018421 | 2/2008 |
| WO | 2008/056123 | 5/2008 |
| WO | 2008/056123 A1 | 5/2008 |
| WO | 2008/150716 A1 | 12/2008 |
| WO | 2009/032809 | 3/2009 |

OTHER PUBLICATIONS

English translation of JP H08-259713—(Apr. 17, 2008)—Toray Industries—Oct. 8, 1996.

* cited by examiner

STRUCTURED THERMOPLASTIC IN COMPOSITE INTERLEAVES

This application is a continuation-in-part of copending PCT application No. PCT/IB2011/000728, which was filed on Apr. 4, 2011.

BACKGROUND OF THE INVENTION

1. Field of the Invention

The present invention relates to prepregs comprising fibres and thermosetting resin which are stacked to form a laminate and subsequently cured to form a composite material. More particularly, the present invention involves the use of thermoplastic veil or other light weight structured thermoplastic material in the laminate interleaves. The present invention also relates to improvements in the electromagnetic response of composite materials, particularly to providing improved resistance to damage caused by lightning strikes.

2. Description of Related Art

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a layer of fibre impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

However, although such cured materials have a number of clear benefits, it has long been known that they can suffer from poor impact resistance and be prone to delamination. This is particularly the case when epoxy resin systems are used, which are known to tend to produce cured systems with low toughness.

A widely employed method of improving the toughness of such arrangements is for the laminate of a plurality of prepreg fibre layers to be interleafed with resin layers. Commonly such resin interleaf layers also comprise a distribution of thermoplastic toughener particles. This arrangement has been shown to increase the toughness of the laminate without having a detrimental effect on other aspects of the laminate.

Laminates that have interleaf layers toughened with thermoplastic particles are typically cured under autoclave conditions, where the high temperatures, and more importantly the high pressures, are generally required to provide cured laminates that meet the particularly exacting mechanical specifications required for structural applications.

A widely used alternative to autoclave cure is the so-called vacuum bag or out-of-autoclave cure. This utilizes a vacuum and relies on atmospheric pressure to press down onto the laminate during cure. Although much more economical than autoclave curing, the maximum pressure applicable in out-of-autoclave curing is atmospheric pressure. Laminates that have interleaf layers toughened with thermoplastic particles have typically not been cured outside of an autoclave because curing at atmospheric pressure or below tends to produce cured laminates that have unacceptable mechanical properties for many structural applications including aerospace structural applications.

It would therefore be desirable to develop a prepreg which could be used to produce laminates that can be cured, either inside or outside of an autoclave, to provide composite parts that are sufficiently tough to be suitable for structural application including aerospace structural applications.

A common composite material is made up from a laminate of a plurality of prepreg fibre layers, e.g. carbon fibres, interleafed with resin layers. These resin layers are believed to provide a significant toughness improvement to the eventual cured laminate.

Although the carbon fibres have some electrical conductivity, the presence of the interleaf layers means that this is only exhibited in the composite in the plane of the laminate. The electrical conductivity in the direction orthogonal to the surface of the laminate, the so-called z-direction, is low.

This lack of conductivity in the z-direction is generally accepted to contribute to the vulnerability of composite laminates to electromagnetic hazards such as lightning strikes. A lightning strike can cause damage to the composite material which can be quite extensive, and could be catastrophic if occurring on an aircraft structure in flight. This is therefore a particular problem for aerospace structures made from such composite materials.

Additionally, composites for use in aerospace applications must meet exacting standards on mechanical properties. Thus, any improvements in conductivity must not impact negatively on mechanical properties.

A wide range of techniques and methods have been suggested in the prior art to provide lightning strike protection to such composite materials, typically involving the addition of conductive elements at the expense of increasing the weight of the composite material. In WO 2008/056123 significant improvements have been made in lightning strike resistance, without significantly increasing weight or affecting mechanical properties, by including metallic conductive particles in the resin interleaf layers so that they contact the adjacent fibre layers and create an electrical pathway in the z-direction. EP 2053078 A1 teaches a prepreg comprising conductive particles and thermoplastic particles.

The present invention aims to obviate or at least mitigate the above described problems and/or to provide improvements generally.

SUMMARY OF THE INVENTION

In accordance with the present invention, uncured laminates are provided where an uncured thermosetting resin and a plurality of fibrous layers are combined such that the fibrous layers are separated by an interleaf zone located between adjacent fibrous layers. As a feature of the invention, one or more layers of structured thermoplastic polymer, such as a veil of thermoplastic fibers or other similar open-structured sheet, are located within one or more of the interleaf zones. The layers of structured thermoplastic polymer are from 0.5 to 50 microns thick and have a weight per unit area of from 1 to 20 grams per square meter.

The use of one or more layers of structured thermoplastic polymer in the interleaf zone not only toughens the cured laminate, but also provides a number of advantages over the conventional use of thermoplastic particles as the interleaf toughening agent. For example, it was discovered that the use of one or more layers of structured thermoplastic polymer as the interleaf toughening agent gives one the option to cure the laminate at relatively low pressures without reducing toughness, as is the case with particulate interleaf tougheners. In addition, two layers of different structured thermoplastic polymers may be located within a single interleaf zone to provide a structured orientation of different thermoplastic polymers that is not possible with a mixture of randomly oriented dissimilar particles. Further, use of structured thermoplastic polymers in the interleaf zone eliminates the problems associated with particulate tougheners that may include some particles that migrate during cure to locations, both inside and outside of the interleaf zone, where their effectiveness may be reduced.

The invention covers the prepreg that is used to make uncured laminates where one or more layers of structured thermoplastic are located within the laminate interleaf zones. Such prepreg include those where the fibrous layer is sandwiched and held between layers of structured thermoplastic and those where one or more layers of structured thermoplastic polymer are located on one side of the fibrous layer.

The invention covers methods for making prepreg and methods for using the prepreg to make laminates. In addition, methods for making cured parts from the prepreg and laminates, as well as the final cured parts, are also covered by the invention.

In one aspect, the invention relates to a prepreg comprising a structural layer of fibres and an open-structured sheet, the prepreg being impregnated with curable resin comprising thermosetting resin.

Such a prepreg, taken alone or when laid together with a plurality of similar prepregs and cured forms a composite laminate having excellent toughness properties, even when the convenient out-of-autoclave cure cycle is employed, and can also achieve the high fibre volumes required in structural applications.

The improved prepregs of the present invention may be used in a wide variety of applications where a lightweight but structurally tough laminate is needed. However, they are particularly useful in aerospace applications, where the technical requirements are particularly exacting.

The invention further relates to a curable prepreg comprising a layer of structural conductive fibres and curable thermosetting resin and comprising an open-structured metal-coated polymeric sheet.

Such a prepreg, taken alone or when laid together with a plurality of similar prepregs and cured to form a composite laminate, has been found to provide excellent electrical conductivity in the z-direction whilst also providing good toughness. Furthermore, the metal-coated sheet is easier to handle than conductive particles. For example it is particularly difficult to ensure that they are evenly distributed in the composite material. Additionally, adding particles to the resin tends to increase its viscosity, presenting further processing constraints and difficulties.

The invention also relates to a curable stack of prepregs, the stack comprising a plurality of layers of structural conductive fibres and a plurality of curable thermosetting resin interleaf layers substantially free of structural fibres, wherein at least one interleaf layer comprises an open-structured metal-coated polymeric sheet.

The above described and many other features and attendant advantages of the present invention will become better understood by reference to the following detailed description when taken in conjunction with the accompanying drawings.

DETAILED DESCRIPTION OF THE INVENTION

The prepreg and laminates of the present invention may be used in place of existing prepreg and laminates where thermoplastic particles, which are insoluble in the resin matrix, are located in the interleaf between fibre plies to increase the damage tolerance of the cured composite part. Such prepreg and laminates are used to form interleaf-toughened composite parts for structural applications in the aerospace industry and in any other application where high structural strength and damage tolerance is required. The present invention involves substituting one or more layers of structured thermoplastic polymer or open-structured sheet into the laminate interleaf zone in place of the thermoplastic particles to provide a number of advantages that are not possible using thermoplastic particles. Accordingly, the present invention may be applied to any of the known manufacturing and curing processes where thermoplastic particles are located in the laminate interleaf as a toughening agent.

The structured layers of thermoplastic polymer are preferably used as a replacement for substantially all (95 weight percent or more) of the thermoplastic particles that would otherwise be placed in the interleaf zones of the laminate. However, mixed systems are possible where thermoplastic particles and structured thermoplastic layers are combined in the interleaf zone. Preferably, the majority (50 weight percent or more) of the insoluble thermoplastic in the interleaf zone will be in the form of one or more structured layers of thermoplastic polymer.

Figure 1:
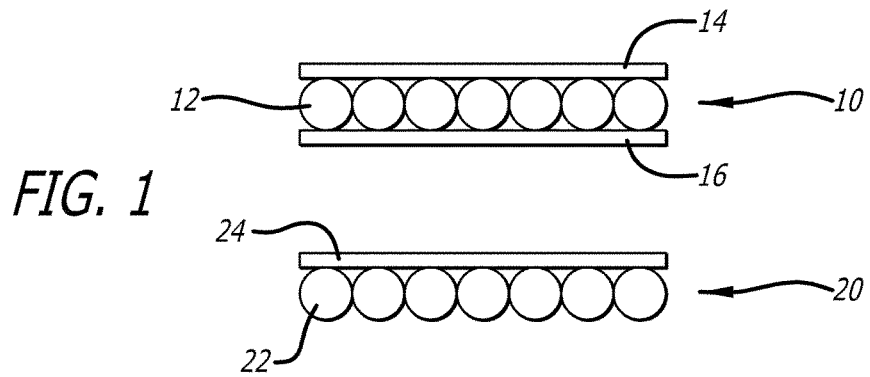
FIG. 1 is a simplified cross-sectional view of two exemplary types of prepreg in accordance with the present invention.

A simplified cross-sectional view of a preferred exemplary prepreg is shown at 10 in FIG. 1. The prepreg 10 includes a single layer of unidirectional fibres 12 which is sandwiched between two layers of structured thermoplastic polymer, such as polyamide veils 14 and 16. The prepreg 10 includes a thermosetting resin, which may be included as one or more layers (not shown) or it can be infused or impregnated throughout all or part of the prepreg 10.

A simplified cross-sectional view of a second preferred exemplary prepreg is shown at 20 in FIG. 1. The prepreg 20 includes a single layer of unidirectional fibres 22 and a single layer of structured thermoplastic polymer, such as polyamide veil 24. The prepreg 20 includes a thermosetting resin, which may be included as one or more layers (not shown) or it can be infused or impregnated throughout all or part of the prepreg 20.

Figure 2:
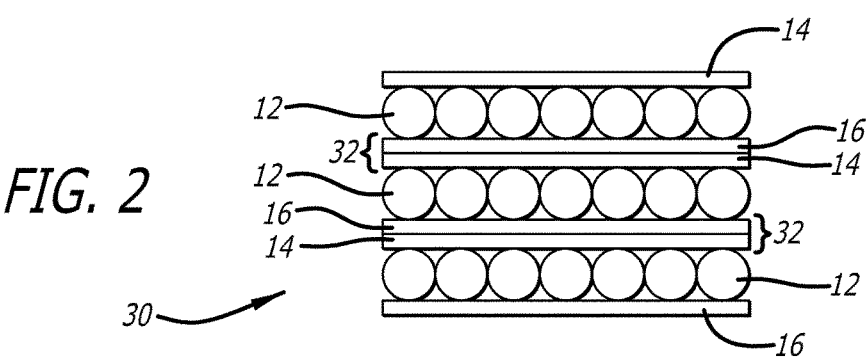
FIG. 2 is a simplified cross-sectional view of an exemplary laminate made from one of the exemplary prepregs shown in FIG. 1.

An exemplary laminate is shown at 30 in FIG. 2 where three layers of prepreg 10 have been stacked to form a 3-layer laminate where there are two structured thermoplastic polymer layers 14 and 16 located in the interleaf zones 32 located between each fibrous layer 12. Another exemplary laminate is shown at 40 in FIG. 2 where three layers of prepreg 20 have been stacked to form a 3-layer laminate where there is one structured thermoplastic polymer layer 24 located in the interleaf zones 42 located between each fibrous layer 22. Only three layers are shown in the figures for demonstrative purposes. The laminate may include many more layers depending upon the design parameters for the particular composite part being made. In addition, two or more layers of structured thermoplastic polymer may be used in place of the single structured layers shown at 14, 16 and 24. Typical laminates comprise from 4 to 200 layers of structural fibres with most or all of the layers separated by a curable thermosetting resin interleaf layer. Suitable interleaf arrangements are disclosed in EP0274899.

The material that is used to form the structured thermoplastic polymer layers 14, 16 and 24 must meet a number of criteria in order for the layers to function properly as a replacement for the insoluble thermoplastic particles that previously have been used in the interleaf zones. The structured polymer layers can be made from the same thermoplastic polymers that have been used to make thermoplastic toughening particles. In general, the thermoplastic must be insoluble in the matrix resin (typically an epoxy) at room temperature and at the elevated temperatures used to cure the resin. Depending upon the melting point of the thermoplastic polymer, it may melt or soften to varying degrees during curing at elevated temperatures and re-solidify as the cured laminate is cooled. Suitable thermoplastics for use in making the structured layer should not dissolve in the resin, as is the case with epoxy-soluble thermoplastics, such as polyethersulfone (PES) and polyetherimide (PEI).

Suitable examples of thermoplastic polymers that may be used to form the structured polymer layers are polyamides (PA), copolyamides (CoPA), ether or ester block polyamides (PEBAX, PEBA), polyphthalamide (PPA), polyesters such as polyethylene terephthalate (PET) and polybutylene terephthalate (PBT), copolyesters (CoPE), thermoplastic polyurethanes (TPU), polyacetals, polyolefins, polyphenylenes sulfones, polyetheretherketones (PEEK), polyetherketoneketone (PEKK), poly(phenylene sulfate) (PPS), thermoplastic polyimides (PI), polyamideimide, liquid crystal polymers (LCP), block copolymers such as styrene-butadiene-methylmethacrylate (SBM) copolymers, methylmethacrylate-acrylate of butyl-methylmethacrylate (MAM) copolymers.

Polyamides and copolyamides are the preferred thermoplastic materials for the structured thermoplastic layers. Particles made from polyamides and copolyamides have been a used as interleaf toughening particles in the past (See U.S. Pat. No. 7,754,322 and published U.S. Patent Application No, 2010/0178487A1). Polyamides come in a variety of types, such as caprolactame (PA6), laurolactame (PA12), copolymers of PA6 and PA12, as well as PA 10 and 11. Any of the polyamides that are suitable for making particles that are used to toughen laminate interleaf zones are also suitable for use in making layers of structured thermoplastic polymer in accordance with the present invention.

Structured polyamide layers will have different melting temperatures depending upon the particular polyamides used to make the layer, the degree of copolymerization of the polyamide and the degree of crystallinity. For example, polyamide layers that contain mostly polyamide 6 will typically have a melting point of above 190° C. Polyamide layers made from PA6 alone will typically have melting points on the order of 213° C., whereas structured layers made from a copolymer of 80 weight percent PA6 and 20 weight percent PA 12 will have melting points on the order of 194° C. When the polyamide copolymer contains 20 weight percent PA6 and 80 weight percent PA12, the melting point drops to around 160° C. Structured polyamide layers made from PA12 alone typically have even lower melting points.

As an advantage of the present invention, the structured thermoplastic layers 14 and 16 or 24 may be made from different types of polyamides. This allows one to mix and match layers of polyamide, or other suitable thermoplastic polymer, within the interleaf zones of the laminate. Since the thermoplastic layers are structured, the placement of each particular type of polyamide can be carefully controlled. This type of directed polyamide placement is not possible with polyamide particles where a mixture of different particle types results in a homogenous blend within the interleaf zone.

As an example, thermoplastic polymer layer 14 would be a veil of PA6/PA12 copolymer fibers and thermoplastic polymer layer 16 would be a veil of PA12 fibers. The resulting laminate 30 would include interleaf zones 32 in which discreet layers of PA6/PA12 and PA12 are located. There are many other combinations possible depending upon the desired number of different thermoplastic polymers, the number of layers placed in each interleaf zone, the orientation and order of prepreg stacking to form the laminate and the orientation of the thermoplastic layers in the prepreg.

The structured thermoplastic polymer layers must be in a physical form that allows them to be substituted in place of particles in the interleaf zone. In particular, the layers must be sufficiently thin to fit within the interleaf zone and the density of the layer must be such that the appropriate amount or concentration of thermoplastic material is present in the interleaf zone to impart the desired amount of damage tolerance. Interleaf zones in cured high strength structural laminates typically have a thickness that ranges from 10 to 100 microns. Preferred interleaf zones range in mean thickness from 15 microns to 50 microns.

The structured thermoplastic layer should have a thickness that allows it to fit within the above interleaf zones along with a thermosetting resin. When more than one structured thermoplastic layer is to be located within an interleaf zone, as is the case with the laminate shown in FIG. 2, the combined thickness of the layers should be less than the desired interleaf zone thickness of the cured laminate. The thickness of the structured layer(s) should be no more than 95 percent of the desired interleaf zone thickness. Preferably, the thickness of the structured layer(s) will not be more than 75 percent of the desired interleaf zone thickness.

The thickness of the structured thermoplastic layers should be from 0.5 microns to 50 microns. The actual thickness for each layer will be determined by the intended thickness of the interleaf zone in the cured laminate, the number of layers desired in each interleaf zone, the density of the structured thermoplastic layer and the amount (concentration) of thermoplastic polymer that is desired within each interleaf zone. The preferred thickness range for the structured thermoplastic layers is front 2 microns to 35 microns and most preferably from 3 microns to 20 microns.

The density of the structured thermoplastic layer must be such that it provides the desired amount (concentration) of thermoplastic toughener to the interleaf zone. The needed density for the layer is directly dependent upon the thickness of the layer being used. The thinner the layer, the denser the layer must be in order to provide the same concentration of thermoplastic toughener in the interleaf zone. The density of the structured thermoplastic layer should be such that it provides a structured layer that has an areal weight of 1 to 20 grams per square meter (gsm) for layers that range from 0.5 to 50 microns in thickness. For preferred thermoplastic layers that are 2 to 35 microns thick, it is preferred that the density of the thermoplastic layer be such that the areal weight of the layer is from 2 gsm to 10 gsm. For layers that are from 3 to 20 microns thick, the density of the layer should be such that the areal weight of the layer is from 2 gsm to 8 gsm.

Figure 4:
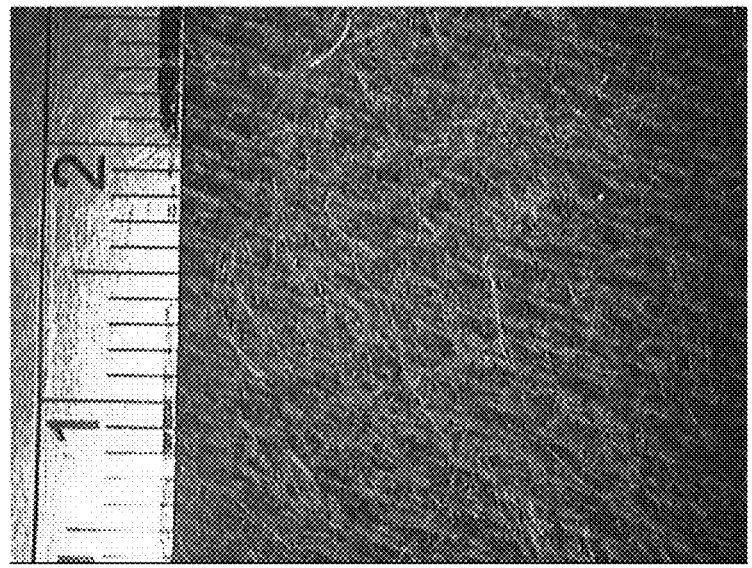
FIG. 4 is a top view of a preferred exemplary thermoplastic veil for use in the laminate interleaf in accordance with the present invention (scale=cm).
Figure 5:
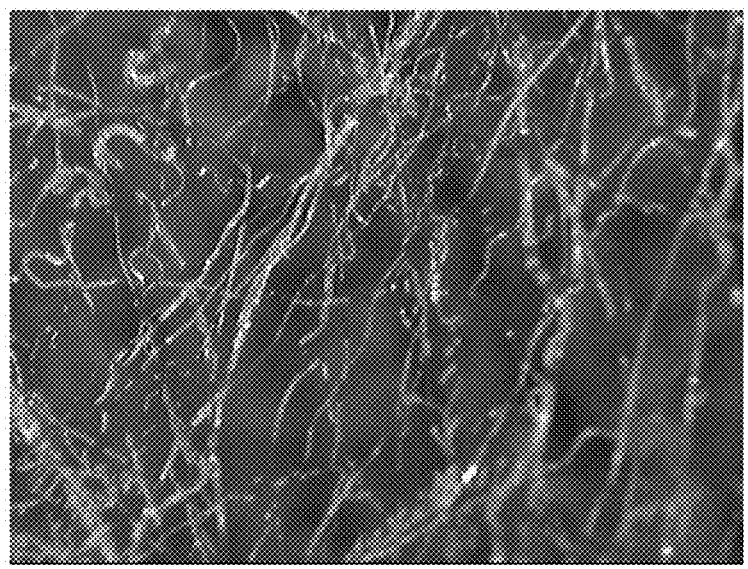
FIG. 5 is a magnified (80×) top view of the preferred exemplary thermoplastic veil shown in FIG. 4.

Structured thermoplastic polymer layers having the required combination of thickness and areal weight are available commercially in the form of spunlaced and random fibrous veils. Woven fabric or scrim is generally not suitable due to the relatively lightweight and thin structure required for the structured thermoplastic layer. Thin solid or porous films are also not preferred. An exemplary lightweight (4 gsm) fibrous veil is shown in FIG. 4 and FIG. 5 (80× magnification). The veil is made from randomly oriented PA12 fibers and is available as 128D04 Nylon veil from Protechnic (Cernay, France). Another suitable nylon veil is 1281D06 Nylon veil, which is a 6 gsm PA12 fibrous veil that is also available from Protechnic.

Fibrous veil of the type shown in FIGS. 4 and 5 are generally classified by the percentage of openness. For example, 128D04 Nylon fibrous veil has an openness of 70 percent. The heavier 128D06 Nylon fibrous veil has an openness of 50 percent. The structured thermoplastic polymer layer should have an openness of between 30 percent to 98 percent, preferably from 50 percent to 95 percent and more preferably from 60 percent to 90 percent. This percentage of openness is required in order to provide free passage of resin through the structured thermoplastic to insure complete mixing of the resin with the thermoplastic fibers. This is particularly important since the thermoplastic fibers do not dissolve in the resin during cure.

The structured thermoplastic layer may also be viewed as an open-structured sheet that is an integral sheet held together by interconnecting and/or overlapping fibres. Such fibres may be woven, knitted, also be random e.g. spunlaced or laid scrim, although non-woven, e.g. random is preferred. Such a sheet is often referred to in the art as a veil.

The open-structured sheet may be characterised by the degree of openness of the sheet, i.e. the percentage of average surface area of the sheet which is made up of open holes in the sheet as determined on an area basis by image analysis of micrographs. The open-structured sheets of the present invention typically have a degree of openness of from 30% to 98%, preferably from 50% to 95%, more preferably from 60% to 90%. This helps to maintain a lightweight sheet and also allows the free passage of resin.

Figure 3:
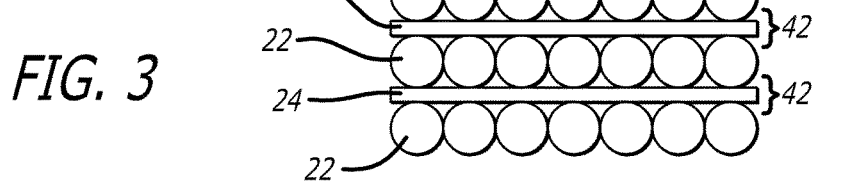
FIG. 3 is a simplified cross-sectional view of an exemplary laminate made from one of the exemplary prepregs shown in FIG. 1.

The structural fibres 12 or 22 may be in the form of random, knitted, non-woven, multi-axial or any other suitable pattern. For structural applications, it is generally preferred that the fibres be unidirectional in orientation as shown in FIGS. 1-3. The laminates in FIGS. 2 and 3 show the various layers of unidirectional fibres oriented in the same direction. This is only one of many possible orientations for stacks of unidirectional fibre layers. For example, unidirectional fibres in neighbouring layers may be arranged orthogonal to each other in a so-called 0/90 arrangement, which signifies the angles between neighboring fibre layers. Other arrangements, such as 0/+45/−45/90) are of course possible, among many other arrangements. The laminates shown in FIGS. 2 and 3 are in a 0/0/0 orientation. When unidirectional fibre layers are used, the orientation of the fibre will typically vary throughout the laminate stack.

The structural fibres 12 or 22 may comprise cracked (i.e. stretch-broken), selectively discontinuous or continuous fibres. The structural fibres may be made from a wide variety of materials, such as carbon, graphite, glass, metalized polymers, aramid and mixtures thereof. Carbon fibres are preferred. Typically the fibres in the structural layer will generally have a circular or almost circular cross-section with a diameter in the range of from 3 to 20 μm, preferably from 5 to 12 μm.

Exemplary layers of unidirectional fibres are made from HexTow® carbon fibres, which are available from Hexcel Corporation (Dublin, Calif.). Suitable HexTow® carbon fibres for use in making unidirectional fibre layers include: IM7 carbon fibres, which are available in fibres that contain 6,000 or 12,000 filaments and weigh 0.223 g/m and 0.446 g/m, respectively; IM8-IM10 carbon fibres, which are available in fibres that contain 12,000 filaments and weigh from 0.446 g/m to 0.324 g/m and AS7 carbon fibres, which are available in fibres that contain 12,000 filaments and weigh 0.800 g/m.

An added advantage of the invention is that the structured thermoplastic may be used to hold dry unidirectional fiber together so that it can be processed using relatively simple prepreg processing equipment, such as that used for making fabric prepreg by film transfer where the fibre handling aspect of the machine is much simpler than typical unidirectional fiber prepreg machines.

As a feature of the present invention, it was discovered that the lightweight fibrous veils and other similar structured thermoplastic layers that can be used as a substitute for thermoplastic interleaf toughening particles, also provide an effective means for holding unidirectional fibre layers together during handling prior to prepreg formation or other resin infusion. The fibrous veils function both as a temporary holding system for the unidirectional fibres and as thermoplastic toughening agent for the cured laminate.

It is preferred that the fibrous veil and similar structured thermoplastic layer be selected so that it provides the desired level of stability to the unidirectional fibre layers during initial handling of the dry unidirectional fibers and that it also provides the desired level of laminate interleaf toughening. It was found that the sandwich configuration shown at 10 in FIG. 1 is a preferred orientation for achieving these two goals. The location of a single lightweight fibrous veil on either side of dry unidirectional fibres was found to provide sufficient holding power to keep the dry unidirectional fibres together during handling. When the laminate was formed (FIG. 2), the single layers of fibrous veil located on opposite sides of the unidirectional fibre layer were combined in the interleaf zone 32 to form a double layer of fibrous thermoplastic material. This double layer of fibrous thermoplastic material was found to provide a sufficient amount of thermoplastic in the interleaf zone to provide desired levels of laminate toughening.

The two layers of fibrous veil are made from randomly oriented thermoplastic fibres. Accordingly, they are preferably attached to the dry unidirectional fibers by partially melting or softening the veils and simultaneously pressing the veils against the unidirectional fibres. The partially melted/softened fibres bond to the unidirectional fibre layer and provide stabilization of the layer when the veils are cooled back below their melting temperatures. The stabilized dry unidirectional fibre layer or tape is then ready for handling or storage prior to addition of resin to form the prepreg 10. This type of sandwich configuration is useful in situations where the addition of resin to form the prepreg is to take place at a later time or different location.

Fibrous veils of thermoplastic material, which have the properties set forth above, are uniquely suited and preferred for use in accordance with the present invention. When appropriately placed, they are able to function as both a substitute for conventional stabilization systems for dry unidirectional fibres and as a substitute for thermoplastic particles used to toughen laminate interleaf zones. Appropriate placement is required in order to achieve the above-described holding function. For example, it was found that a single layer of fibrous veil of the type suitable for use as an interleaf toughener, when bonded to only one side of dry unidirectional fibres, is not sufficient to hold the dry fibres together during subsequent handling of the dry fibres. Accordingly, it is necessary to provide additional support to the dry unidirectional fibres or employ a process where the resin and fibrous veil are simultaneously applied to the unidirectional fibers to form a prepreg of the type shown at 20.

Typically the fibres 12 and 22 of the prepregs 10 and 20, respectively, will be substantially impregnated with a thermosetting resin (not shown). For example, prepregs with a resin content of from 30 to 45 wt % of the total prepreg weight are preferred. The prepregs of the present invention are predominantly composed of resin and structural fibres. Typically the prepreg comprises from 25 to 50 wt % of curable resin. Additionally the prepregs typically comprise from 45 to 75 wt % of structural fibres.

The resin in the prepreg is also preferably present in an amount that forms a resin-rich region on the surface of the prepreg that is an essentially fibre-free layer adjacent to the structural fibre layer. When a plurality of such prepregs is laid together, the fibre-free resin layers form the interleaf layers between the structural fibre layers.

As discussed above, the prepregs according to the invention are intended to be laid up with other prepregs, to form a curable stack of prepregs. Thus, one aspect, the invention relates to a curable stack of prepregs, the stack comprising a plurality of layers of structural fibres and a plurality of curable thermosetting resin interleaf layers substantially free of structural fibres, wherein at least one interleaf layer comprises at least one structured thermoplastic layer. Typically, most of the interleaf layers will comprise a structured thermoplastic layer or open-structured sheet. In a preferred embodiment at least half of the interleaf layers comprise an open-structured sheet. It may even be desirable for at least 75% of the interleaf layers to comprise such a sheet, or even substantially all of the interleaf layers as shown in FIGS. 2 and 3.

Typically, the fibres in the prepreg stack will be substantially impregnated with the resin. For example, prepreg stacks with a resin content of from 30 to 45% of the total weight of the prepreg stack or laminate are preferred.

As discussed above, in the eventual cured composite laminate, the open-structured polymeric sheet is located at or in the interleaf layer. However, during the heating stage prior to cure, the thermosetting resin has a reduced viscosity which tends to encourage the movement of the open-structural sheet into the interleaf layer. Thus, it is only necessary in the prepreg or prepreg stack for the open-structured sheet to be in contact with the resin layer, and not necessarily embedded therein.

It has been found that the improvements in toughness can be achieved even though the structured thermoplastic polymer layer or open-structured sheet is very lightweight. This is particularly important for aircraft structural applications. Thus, open-structured sheets having weights per unit area in accordance with the present invention, as set forth above, are particularly well-suited for aerospace applications.

In the preferred embodiment shown at 10, the prepreg comprises two open-structured sheets located on either side of the structural layer of fibres. This can aid in handling the prepreg, particularly prior to resin impregnation and can provide further increases in toughness. Preferably the two sheets are substantially identical. However, they may also be made from different thermoplastic polymers to provide specific targeting of different toughening agents within the interleaf zone.

The prepreg and prepreg stack of the present invention typically comprise a very low quantity of entrapped gas so that the degree of resin impregnation in the interstices of the structural fibres is high. Thus, they preferably have a water pick-up value of less than 9%, more preferably less than 6%, most preferably less than 3%. The water pick-up test is well known in the art and involves immersing an edge of a small piece of unidirectional prepreg into water.

The prepreg is intended to be laid-up with other composite materials (e.g. other prepregs according to the invention or otherwise) to produce a curable laminate or prepreg stack according to the present invention.

The prepreg is typically produced as a roll of prepreg and in view of the tacky nature of such materials, a backing sheet is generally provided to enable the roll to be unfurled at the point of use. Thus, preferably the prepreg according to the invention comprises a backing sheet on an external face.

The curable resin may be selected from epoxy, isocyanate, benzoxazine, bismaleimide and acid anhydride, for example. Preferably the curable resin is an epoxy resin.

Suitable epoxy resins may comprise monofunctional, difunctional, trifunctional and/or tetrafunctional epoxy resins.

Suitable difunctional epoxy resins, by way of example, include those based on; diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be preferably selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N,N'-tetraglycidylmethylenedianiline (e.g. MY 0720 and MY0721 from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced. Materials), and Araldite ECN 1299 (from Huntsman Advanced Materials).

The curable resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones and methylene bisanilines, e.g. 4,4'-diaminodiphenyl sulphone (4,4' DDS), and 3,3'-diaminodiphenyl sulphone (3,3' DDS), 4,4'-methylenebis(2-methyl-6-isopropylaniline (M-MIPA), 4,4'-methylenebis(3-chloro-2,6-diethylene aniline (M-CDEA), 4,4'-methylenebis (2,6 diethyleneaniline) (M-DEA) and the phenol-formaldehyde resins. Preferred curing agents are the methylene bisanilines and the amino sulphones, particularly 4,4' DDS and 3,3' DDS.

The prepregs according to the present invention can be manufactured in a variety of ways. For example, the structural fibres may be brought into contact with the structured thermoplastic polymer layer or open-structured sheet and then, whilst in contact, are together passed to an impregnation stage where at least one layer of resin is brought into contact with an external face of the fibre and open-structured sheet (structured thermoplastic polymer layer) combination, and pressure applied to induce resin impregnation. Alternatively the open-structured sheet (structured thermoplastic polymer layer) can be applied to the resin layer, and thereafter the structural fibre layer is brought into contact with the resin and open-structured sheet (structured thermoplastic polymer layer) combination, before pressure-induced resin impregnation occurs. As a further alternative the structural layer may be resin impregnated without the open-structured sheet (structured thermoplastic polymer layer), which is subsequently laid-down onto an external surface of the resin-impregnated structural layer.

However, due to their light and delicate nature, the structure thermoplastic polymer layers or open-structured sheets used in the present invention can be difficult to handle, particularly if they are to be laid onto a tacky resin surface. Thus, it has been found to be preferable if the structured thermoplastic polymer layer is laid down onto a resin-free surface.

Thus, in another aspect, the invention relates to a process for the manufacture of a prepreg, the process comprising feeding a structural layer of fibres in contact with an adjacent structured thermoplastic polymer layer or open-structured sheet, and bringing into contact with an external face of the structural layer and/or the structured thermoplastic polymer layer (open-structured sheet) a layer of curable resin comprising thermosetting resin, and compressing the resin, fibres and sheet together, sufficient to induce at least partial resin impregnation into the interstices between the structural fibres.

As mentioned previously, it is advantageous for the structural layer of fibres to be sandwiched between two adjacent open-structured sheets (structured thermoplastic polymer layer) prior to resin impregnation, as this helps to maintain the integrity of the fibres, particularly when the structural fibres are unidirectional. In a preferred process, the fibres of the open-structured sheet are adhered to the fibres by partially melting them.

In order to increase the rate of impregnation, the process is preferably carried out at an elevated temperature so that the viscosity of the resin is reduced. However it must not be so hot that premature curing of the resin begins to occur. Thus, the process is preferably carried out at temperatures of from 40° C. to 100° C.

The resin is typically spread onto the external surface of a roller and coated onto a paper or other backing material to produce a layer of curable resin. The resin can then be brought into contact, and optionally also impregnated, by passing the structural layer, open-structured sheet (structured thermoplastic polymer layer) and resin-coated paper through rollers. The resin may be present on one or two sheets of backing material, which are brought into contact with the structural layer and open-structured sheet (structured thermoplastic polymer) by passing them through heated consolidation rollers to impregnate.

If a backing sheet is to be applied then this can be carried out either before or after impregnation of the resin. However, it is typically applied before or during impregnation as it can provide a non-stick surface upon which to apply the pressure required for resin impregnation. Typically the backing sheet is the one on which the resin was mounted, although it can be removed and replaced with a different sheet as desired.

Once prepared the prepreg is typically rolled-up, in which form it can be stored for a period of time. It can then be unrolled and optionally laid up with other prepregs to form a prepreg stack as defined herein.

Once prepared, the prepreg or prepreg stack is cured by exposure to elevated temperature, and optionally elevated pressure, to produce a cured laminate. As discussed above, the prepregs of the present invention can provide excellent toughness without requiring the high pressures encountered in an autoclave process.

Thus, in further aspect, the invention relates to a process of curing a prepreg or prepreg stack as described herein, the process involving exposing the prepreg to a temperature sufficient to induce curing and carried out at a pressure of less than 3.0 bar absolute.

The curing process may be carried out at a pressure of less than 2.0 bar absolute. In a particularly preferred embodiment the pressure is less than atmospheric pressure. The curing process may be carried out at one or more temperatures in the range of from 80 to 200° C., for a time sufficient to cause curing to the desired degree.

Curing at a pressure close to atmospheric pressure can be achieved by the so-called vacuum bag technique. This involves placing the prepreg or prepreg stack in an air-tight bag and pulling a vacuum on the inside of the bag. This has the effect that the prepreg stack experiences a consolidation pressure of up to atmospheric pressure, depending on the degree of vacuum applied.

Once cured, the prepreg or prepreg stack becomes a cured composite laminate, suitable for use in a structural application, for example an aerospace structure.

Such composite laminates can comprise structural fibres at a level of from 55% to 70% by volume, preferably from 58% to 65% by volume.

The present invention has particular application as an alternative to epoxy-based prepreg where the insoluble interleaf toughening agent is provided as resin-insoluble thermoplastic particles. For example, see U.S. Pat. No. 7,754,322 B2 and WO 2008/040963. These types of epoxy resins that are used to form toughened interleaf zones typically include a soluble thermoplastic toughening agent, such as polyethersulfone or polyetherimide. These soluble toughening agents are included in amounts that range from 5 to 25 weight percent of the overall resin composition. The soluble toughening agents are typically added to the epoxy resin mixture prior to addition of the curing agent and heated to an elevated temperature to dissolve the thermoplastic curing agent and then cooled. Insoluble thermoplastic particles, the curing agent and any other additives are added to the resulting mixture and then used in combination with fiber layers to form prepreg. The insoluble thermoplastic particles are typically added in amounts of between 1 and 15 weight percent of the overall resin composition.

During prepreg and laminate formation, as well as curing of the laminate, the insoluble particles, which generally have mean particle sizes between 5 and 60 microns, become concentrated in the interleaf zones and other areas outside of the structural fibre layers. This is because the substantial majority of insoluble particles are too large to enter into the interstitial openings of the fibre layer. Due to processing and other manufacturing considerations, the particle powders that are used as the insoluble thermoplastic tougheners may have small amounts of particles that are substantially smaller or larger than the target size range. The smaller particles present a problem in that they can migrate into the fibre layers during laminate formation and curing where their effectiveness as an interleaf toughener is diminished. The larger particles present a problem with respect to possible disruption of the interleaf zone during curing of the laminate due to their relatively large size.

The present invention involves providing structured thermoplastic polymer layers that are uniformly thick and contain insoluble fibers that cannot possibly enter into the structural fiber layers. The layer thicknesses and densities are chosen so that the amount of insoluble thermoplastic toughener located within the interleaf zone falls within the same range as is provided by using the above-described resins that contain insoluble thermoplastic particles. The present invention provides the dual advantage of making sure that all of the insoluble thermoplastic toughener that is present in the prepreg remains in the interleaf zones of the laminates while at the same time insuring that the interleaf zone is not disrupted due to variations in thermoplastic material sizes and shapes.

The unique properties of lightweight veils of thermoplastic fibres, and other similar structured thermoplastic polymer layers, make it possible to cure the laminates using such veils in an out-of autoclave process. This relatively low pressure and low cost curing process can be used because the damage tolerance (e.g. Compression After Impact—CAI) of the cured laminate is not substantially less than the damage tolerance achieved using the higher pressure and higher expense of an autoclave. In contrast, out-of-autoclave curing of laminates that have interleaf zones toughened with insoluble thermoplastic particles produces cured laminates that have damage tolerances that are significantly reduced.

For structural uses in aerospace and other high tolerance applications, it is preferred that a laminates in accordance with the present invention comprising 32 plies of 145 gsm fibre areal weight prepreg in a quasi-isotropic stack arrangement have a CAI value at 30 kJ (according to AITM 1.0010 or EN6038) of greater than 250 MPa, preferably greater than 300 MPa.

It was discovered that coating thermoplastic veils and other structured thermoplastic polymers of the type described above with metal or other conductive material provides especially good electrical conductance vertically through the resulting laminates while still preserving the unique toughening properties described above. The following description is directed to providing additional description of metal-coated structured thermoplastics and there use in prepreg and laminate interleafs in accordance with the present invention to provide conductive composite materials.

Typically the fibres of the metal-containing prepreg will be substantially impregnated with the resin. For example, prepregs with a resin content of from 30 to 45 wt % are preferred.

The resin in the metal-containing prepreg is also preferably present as an essentially fibre-free layer which may be adjacent to the structural fibre layer. When a plurality of such prepregs are laid together, the fibre-free resin layers form the interleaf layers between the structural fibre layers. The metal-containing prepregs according to the invention are intended to be laid up with other prepregs, to form a curable stack of prepregs.

Such a stack may comprise from 4 to 20 layers of structural conductive fibres with most or all of the layers separated by a curable thermosetting resin interleaf layer. Suitable interleaf arrangements are disclosed in EP0274899. Such interleaf layers preferably have a mean thickness of from 15 to 50 micrometers. Typically, the fibres in the prepreg stack will also be substantially impregnated with the resin. For example, prepreg stacks with a resin content of from 30 to 45% are preferred.

Typically a plurality of the interlayers comprise an openstructured metal-coated polymeric sheet. The polymeric sheet may comprise a thermoplastic polymer, a thermoset polymer and/or a combination of the aforesaid polymers. Preferably, the polymeric sheet or veil comprises a polyamide thermoplastic polymer. In a preferred embodiment at least half of the interleaf layers comprise an open-structured metal-coated polymeric sheet. It may even be desirable for at least 75% of the interleaf layers to comprise such a sheet, or even substantially all of the interleaf layers.

It has been found to be advantageous, in the eventual cured composite laminate, that the metal-coated polymeric sheet is located at or in the interleaf layer. However, during the heating stage prior to cure, the thermosetting resin has a reduced viscosity which tends to encourage the movement of the open-structural sheet into the interleaf layer. Thus, it is only necessary in the prepreg or prepreg stack for the open-structured metal-coated polymeric sheet to be in contact with the resin layer, and not necessarily embedded therein.

It is therefore believed that the improvement in z-direction conductivity arises due to the open-structured metal-coated polymeric sheet making points of contact with adjacent layers of structural conductive fibres, by being located in the interleaf layer.

The metal coating may be selected from a variety of electrically conducting metals, for example, silver, copper, nickel, gold, platinum, aluminum and mixtures thereof. A preferred material is silver.

The open-structured sheet is preferably made from polymeric fibres, arranged in a wide variety of ways, for example, random, woven, spunlaced, knitted or laid scrim. Continuous or non-continuous (chopped) fibers may be used.

The open-structured metal-coated polymeric sheet may be made by coating an open-structured polymeric sheet with a suitable metal coating by any suitably known method in the art such as vapour deposition, sintering, vacuum deposition, sputtering or electroless plating. Typically the thickness of the metal coating will be less than 1.0 micrometers, typically ranging from 0.01 to 1.0 micrometers, more preferably from 0.1 to 1.0 micrometers. It is preferred that essentially all of the fibres are coated in a metal, so that the sheet has a metallic appearance. The polymeric sheet may comprise fibres having a thickness ranging from 5 to 40 microns, preferably from 10 to 20 micrometers.

The invention also provides the surprising effect that despite the presence of the open-structural metal-coated polymeric sheet in the interlayer, the improved toughness in the eventual cured composite laminate provided by the interleaf layer is not negatively impacted.

Utilizing a polymeric material as the bulk of the material of the sheet is believed to provide a number of advantages. Firstly, such a material can be produced as a very lightweight material in view of the low material densities of most polymers. Secondly, it is believed that the polymeric material can positively contribute to the toughness of the eventual composite laminate. Thus, rather than the metal-containing open-structured sheet reducing the toughness of the eventual cured laminate, the polymeric nature of the sheet improves the to toughness.

Suitable examples of polymers that may be used to form the metal-containing open-structured sheet include polyamides, such as PA12, PA11, PA6/6 and PA6, polyesters such as PET and PBT, polysulfones, polyether sulfones, polyimides, such as the Ultems, polyacrylonitrile and polyphenyl sulphide. Also, Vectran (liquid crystal PET), phenoxy (grilon MS), TPU (thermoplastic polyether polyurethane), (p-phenylenebenzobisoxazole) (PBO fibres), poly(p-phenylenebenzobisthiazole) (PBT or PBZT fibres) and also fibres made using copolymers PA6/PA12 and mixtures thereof are suitable. The polyamides may comprise a melting point in the range of 170 to 280° C., preferably from 175 to 190° C.

A further advantage of the open-structured sheet is that it is believed to assist in maintaining an evenly spaced interleaf layer. This is because the metal-containing sheet, as mentioned previously, can act as a spacer between adjacent conductive fibre layers. Thus, the metal-containing open-structured sheet is typically quite thin, having a thickness in the range of from 5 to 30 micrometers, preferably front 10 to 20 micrometers. As it is important that the open-structured sheet forms contacts with adjacent structural conductive fibre layers, preferably the thickness is from 50 to 100% of the mean thickness of the interleaf layer.

It has also been found that it is beneficial that the metal-containing open-structured sheet has a thickness which does not significantly vary throughout the sheet. This can, for example, be achieved by compressing the sheet prior to formation of the prepreg, for example by calendaring (compressing). In this way the thickness of the sheet can be kept within tight tolerances so that the difference between the maximum and minimum thickness is less than 1.0 micrometer.

The metal-containing open-structured sheet may be further characterised by the degree of openness of the sheet, i.e. the percentage of an average surface area of the sheet which is made up of open holes in the sheet. The openness may also be calculated as the percentage of open areas in 1 m$^2$ from the mesh size, fiber thickness and number of meshes in 1 m$^2$. The open-structured sheets may have a degree of openness of from 10 to 90%, preferably from 20 to 80%, more preferably from 30 to 70%.

It is common in the art for such interleaf layers to contain thermoplastic particles, which are believed to contribute to the toughness of the eventual cured composite material. In the present invention, such particles may be employed if desired, or alternatively they may be omitted. It is believed that the polymer of the open-structured sheet can provide much, if not all, of the toughness provided by such thermoplastic particles, reducing or eliminating the toughness benefits provided by the thermoplastic particles.

Thus, the invention allows for the possibility of a further improvement, in that thermoplastic toughening particles can be omitted. This can further simplify processing difficulties involved in handling, blending and distributing such particles. Thus, preferably the fibre-free resin layer in the prepreg, and therefore also the interleaf layer in the prepreg stack, is substantially free of thermoplastic particles.

It is highly preferable if the metal containing open-structured sheet is fairly lightweight as is the case for sheets describe previously without the metal coating. This is all the more important in embodiments which comprise many layers of such material. Surprisingly, it has been found that the improvements in conductivity and toughness can be achieved with such a light sheet. Thus, preferably the open-structured metal-coated polymeric sheet has a weight of from 5 to 20 grams per square meter (gsm), preferably from 5 to 15 gsm.

The conductive prepregs of the present invention are themselves fairly thin, for example being from 0.2 to 5.0 mm thickness, more preferably from 0.5 to 2 mm, and even more preferably from 0.2 to 1 mm thickness. We have further found that the toughness of a laminate comprising the conductive curable prepreg of the invention is improved in comparison to a laminate comprising a curably prepreg in the absence of a polymeric sheet.

For conductive prepregs, the fibres in the structural fibre layers may be unidirectional, fabric form or multi-axial. Preferably the fibres are uni-directional and their orientation will vary throughout the prepreg stack and/or laminate, for example by arranging for the fibres in neighbouring layers to be orthogonal to each other in a so-called 0/90 arrangement, signifying the angles between neighbouring fibre layers. Other arrangements such as 0/+45/−45/90 are of course possible among many other arrangements. The fibres may comprise cracked (i.e. stretch-broken), selectively discontinuous or continuous fibres.

The conductive fibres may be made from a wide variety of materials such as metallised glass, carbon, graphite, metallised polymers and mixtures thereof. Carbon fibres are preferred.

The thermosetting resins used with the metal-coated open-structured sheet are the same as for the non-metal coated sheets and may be selected from those conventionally known in the art, such as resins of phenol-formaldehyde, urea-formaldehyde, 1,3,5-triazine-2,4,6-triamine (melamine), bismaleimide, epoxy resins, vinyl ester resins, benzoxazine resins, polyesters, unsaturated polyesters, cyanate ester resins, or mixtures thereof.

Particularly preferred are epoxy resins, for example monofunctional, difunctional or trifunctional or tetrafunctional epoxy resins. Preferred difunctional epoxy resins include diglycidyl ether of Bisphenol F (e.g. Araldite GY 281), diglycidyl ether of Bisphenol A, diglycidyl dihydroxy naphthalene and mixtures thereof. A highly preferred epoxy resin is a trifunctional epoxy resin having at least one meta-substituted phenyl ring in its backbone, e.g. Araldite MY 0600. A preferred tetrafunctional epoxy resin is tetraglycidyl diamino diphenylmethane (e.g. Araldite MY721). A blend of di- and tri functional epoxy resins is also highly preferred.

The thermosetting resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones, e.g. 4,4'-diaminodiphenyl sulphone (4,4' DDS), and 3,3'-diaminophenyl sulphone (3,3' DDS), and the phenol-formaldehyde resins. Preferred curing agents are the amino sulphones, particularly 4,4' DDS and 3,3' DDS.

Once formed, the metal-containing prepreg or prepreg stack is cured by exposure to elevated temperature and optionally elevated pressure, to produce a curable laminate. Known methods of curing may be employed such as the vacuum bag, autoclave or press cure methods.

The cured metal-containing laminates that are produced using the coated veils or sheets have remarkably low electrical resistance, with a 3 mm thick laminate having an electrical resistance of less than 5Ω, preferably less than 2Ω, less than 1Ω, or even less than 0.5Ω being possible, as measured in the z-direction according to the test method described below. The cured laminates further have an improved toughness in comparison to cured laminates in which the polymeric sheet is absent.

The present invention is particularly suitable for applications in the aerospace industry, particularly in the formation of aircraft body panels.

As well as lightning strike resistance, it is also desirable to reduce or prevent a phenomenon known as "edge glow" following a lightning strike. This is caused by a build up of electrical charge at the ends of a composite structure and can become a source of ignition.

It has been found that composite materials for use in aircraft body structures can suffer from such edge glow problems. This is a particularly hazardous problem if composite materials are intended to form part of a fuel tank construct. Thus, the aspect of the invention involving metal-coating of the structured sheets or veils is ideally suited to provide a cured laminate composite component of an aircraft fuel tank construct.

The invention will now be illustrated by reference to the following examples.

Example 1 (Prepreg A)

A sheet of 145 gsm IM-12K UD fibre surrounded on both sides by an open-structured sheet (4 gsm (128D04 from Protecnic, France)) was made. A prepreg was made from this open-structured sheet and UD fibre by applying to either side an epoxy-based M56 resin film (a mixture of MY721 epoxy resin (available from Huntsman) with dissolved polyethersulphone and methylene bisaniline curative) of 36 gsm and passing through consolidation rollers to form a prepreg. The resultant prepreg had a resin content of 32%.

Comparative Example 2 (Prepreg B)

A comparative prepreg was manufactured as in Example 1 using UD fibre but without the veil to form a prepreg of the same areal weight and with a resin content of 35%.

Example 3 (Prepreg C)

A prepreg was manufactured by applying 36 gsm M56 resin films to either side of 134 gsm AS7-12K UD fibre and passing through consolidation rollers. Subsequently, 128D04 veil was then applied to one side of the prepreg before passing through a further set of consolidation rollers. The resultant prepreg according to the invention had a resin content of 35%.

Comparative Example 4 (Prepreg D)

A comparative prepreg was made according to Example 3 but without the open-structured sheet and had a resin content of 35%.

Comparative Example 5 (Prepreg E)

A modified M56 resin was produced by adding during mixing, 10% Orgasol 1002 DNAT1 particles (20 micron PA6) available from Arkema. A prepreg was made from this modified M56 resin by applying 39 gsm film either side of 145 gsm UD IM7-12K fibres and passing through consolidation rollers to form a prepreg. The resultant prepreg had a resin content of 15%.

Comparative Example 6 (Prepreg F)

A modified M56 resin was produced by adding during mixing, 10% Micropan 777 particles (7 micron PA6) available from Chemopharma, Czech Republic. A 35% resin content prepreg with 145 gsm IM7-12K fibres was made in the same way as Example 5.

Manufacture of Composite Laminates

Prepregs A-F, were used to manufacture 32 ply quasi-isotropic laminates of size 400×400 mm. The plies were debulked every four plies. The laminates were cured in a vacuum bag inside an air-circulating oven according to the following cure cycle.

ramp to 110° C. at 1° C./min
dwell 110° C. for 60 minutes
ramp 1° C./min to 180° C.
dwell 180° C. for 120 minutes.

The vacuum level was reduces to half vacuum (−0.5 bar) after the end of the 110° C. dwell. Prior to that vacuum level was greater than −0.9 bar The laminates produced were designated laminates A-F, according to their corresponding prepregs.

Laminate Thickness

Laminate thickness and cured ply thickness are shown in the Table 1 below. A comparison of A to B and C to D shows that using the structured thermoplastic does not increase laminate thickness even when curing with vacuum pressure only.

TABLE 1

| Laminate | Laminate thickness (mm) | Cured ply thickness cpt (mm) |
|---|---|---|
| A | 4.70 | 0.147 |
| B (Comparative) | 4.77 | 0.149 |
| C | 4.51 | 0.141 |
| D (Comparative) | 4.41 | 0.138 |
| E (Comparative) | 4.78 | 0.149 |
| F (Comparative) | 4.99 | 0.156 |

CAI Measurements

Laminates A-F were tested for compression strength after impact according to test method AITM 1.0010 (EN6038). Laminates according to the invention (A and C) can be seen to have significantly improved CAI strengths over laminates without an open-structured sheet (B and D). Laminate A, which uses the same IM7-12K fibres as laminates E and F, has a significantly higher CAI value. This demonstrates the advantage of using structured thermoplastic polymer layers in accordance with the invention instead of thermoplastic particles when curing out of the autoclave.

TABLE 2

| Impact Energy (J) | CAI Strength (MPa) | | | | | |
|---|---|---|---|---|---|---|
| | A | B | C | D | E | F |
| 10 | 411 | 348 | — | — | 338 | 338 |
| 20 | 411 | 276 | — | — | 309 | 307 |
| 25 | 376 | 259 | — | — | 272 | 255 |
| 30 | 339 | 223 | 277 | 184 | 280 | 246 |
| 40 | 285 | 217 | — | — | 225 | 235 |
| 50 | 250 | 180 | — | — | 215 | 204 |

Other Mechanical Properties

Other composite properties for materials C and D were tested according to the table below. The results demonstrate that the veil does not have any detrimental effect on these other properties.

TABLE 3

| Test | Test Standard | Conditions | Laminate C | Laminate D (Comparative) |
|---|---|---|---|---|
| OHC strength (MPa) | AITM 1.0008 | 70° C. Wet | 246 | 230 |
| OHT strength (MPa) | AITM 1.0007 | 70° C. Wet | 339 | 352 |

Conductive Examples

Test Method-Resistance of Conductive Composite Laminates

A panel is prepared from prepreg by autoclave cure that is 300 mm×300 mm×3 mm in size. The layup of the panel is 0/90. Specimens (typically three to four) for testing are cut from the panel at sizes of 36 mm×36 mm. The square faces of the specimens are sanded (for example on a Linisher machine) to expose the carbon fibres. This is not necessary if peel ply is used during the cure. Excess sanding is avoided as this penetrates past the first ply. The square faces are then coated with an electrically conductive metal, typically a thick layer of gold via a sputterer. Any gold or metal on the sides of the specimens is removed by sanding prior to testing. The metal coating ensures low contact resistance.

A power source (TTi EL302P programmable 30V/2 A power supply unit, Thurlby Thandar Instruments, Cambridge, UK) that is capable of varying both voltage and current is used to determine the resistance. The specimen is contacted with the electrodes (tinned copper braids) of the power source and held in place using a clamp whereby it is ensured that the electrodes do not touch each other or contact other metallic surfaces as this will give a false result. The clamp has a non-conductive coating or layer to prevent an electrical path from one braid to the other. A current of 1 A is applied and the voltage noted. Using Ohm's Law resistance R can then be calculated (R=V/I). The test is carried out on each of the cut specimens to give a range of values. To ensure confidence in the test each specimen is tested two times.

Conductive Example 1

Figure 8:
FIG. 8 is a magnified (450×) view of a preferred metal coated veil that is made from chopped fibres.
Figure 9:
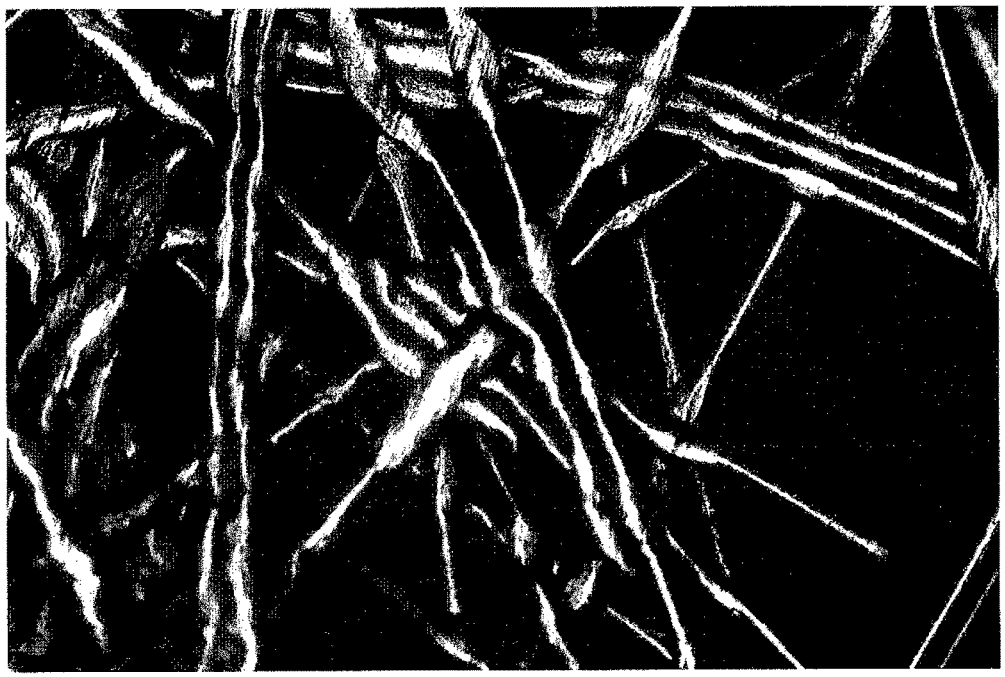
FIG. 9 is another magnified (450×) view of a preferred metal coated veil that is made from chopped fibres.

Eight plies of a M21E prepreg (available from Hexcel) were laid up (0/90). Between each ply was placed polyamide veil (PA 6) that had been coated with silver and then calendered (compressed) to produce a material that was both lightweight and very thin. The veil had a weight of 11 gsm and was 10-20 microns thick. Photomicrographs of the veil are shown in FIGS. 8 and 9 where the fibers are shown in white. The fibers have an average diameter of about 15 microns and a melting point of 252-260° C.

The prepreg was cured in an autoclave at 180° C. and 3 bar pressure. The through thickness resistance was determined as outlined above and the result shown in the Table 1 below and compared to a Comparative Example made by the same process and having interleaf layers comprising resin but without a sifter-coated veil.

TABLE 1

| Conductive Examples | |
|---|---|
| Panel description | Through thickness resistance (Ohms) |
| Comparative Example | 7.0 |
| Example 1 | 0.40 |

Figure 6:
FIG. 6 is an image of a cross-section through a cured composite laminate according to the invention where the veil is made from chopped fibres that have been coated with metal.
Figure 7:
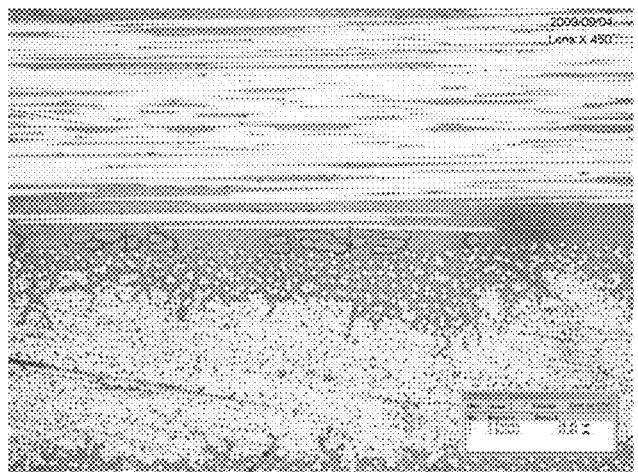
FIG. 7 is an image of a cross-section through another cured composite laminate according to the invention where the veil is made from chopped fibres that have been coated with metal.

Images of cross-sections through the composite material of Conductive Example 1 are shown in FIGS. 6 and 7. The cross-sections show the veil acting as an interleaf region with an average thickness of 25 micron. Also the veil is touching the carbon plies.

Conductive Example 2

8 plies of a M21E prepreg (available from Hexcel) were laid up to form a laminate of Sample A. This material was cured in an autoclave at 180° C. and 3 bar pressure. The through thickness resistance was determined as outlined above. 8 plies of a M21E prepreg containing 0.5 wt % of solid carbon microspheres in the resin were laid up to form a laminate of Sample B. This material was also cured in an autoclave at 180° C. and 3 bar pressure. The through thickness resistance was again determined. Finally, 8 plies of M21E prepreg with silver coated polyamide PA12 polymeric sheets in the interleafs between the plies were laid up to form a laminate of Sample C. Again the through thickness resistance was determined. The results are presented in the below Table 2.

TABLE 2

| Conductive Examples | |
|---|---|
| Panel description | Through thickness resistance (Ohms) |
| Sample A | 5-10 |
| Sample B | 0.4 |
| Sample C | 0.4 |

It should be noted that any of the veils described in Examples 1 and 3 can also be coated with metal to provide conductive laminates of the type described in Conductive Examples 1 and 2. As described in detail above, metal coatings are the preferred form of imparting electrical conductance to the structured sheet or veil. However, conductive materials, other than metal, may be used provided that they impart the desired degree of electrical conductivity to the veil.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for making a laminate comprising a plurality of electrically conductive fibrous layers and an uncured thermosetting resin wherein said fibrous layers comprise structural conductive fibres and are separated by an interleaf zone located between adjacent fibrous layers, said method providing spacing between said fibrous layers and providing electrical conductance between said fibrous layers across said interleaf zone, said method comprising the steps of:
providing an electrically conductive nonwoven veil comprising polyamide fibers that have been coated with a coating of conductive metal, said nonwoven veil weighing from 5 to 20 grams per square meter;
compressing said electrically conductive nonwoven veil to form an electrically conductive calendared open-structured polymeric sheet which is from 5 microns to 30 microns thick, said calendared open-structured polymeric sheet having a maximum thickness and a minimum thickness, said nonwoven veil being compressed a sufficient amount to form said calendared open-structured polymeric sheet wherein the difference between said maximum thickness and said minimum thickness is less than 1 micron;
providing two fibrous layers comprising electrically conductive structural fibres and an uncured thermosetting resin;
locating the two fibrous layers adjacent to each other to form an interleaf zone between the two fibrous layers; and
forming said laminate by locating said calendared open-structured polymeric sheet within the interleaf zone, said calendared open-structured polymeric sheet acting as a spacer to provide spacing between said fibrous layers and also providing electrical conductance between said fibrous layers across said interleaf zone.

2. A method for making a laminate according to claim 1 wherein said metal is selected from the group consisting of silver, copper, nickel, gold, platinum, aluminum and mixtures thereof.

3. A method for making a cured laminate comprising the method according to claim 1 which comprises the additional step of curing said uncured thermosetting resin.

4. A method for making a cured laminate according to claim 3 wherein a pressure of about 1 atmosphere or less is applied to said laminate during said step of curing said uncured thermosetting resin.

5. A method for making a composite part comprising the method according to claim 3 which includes the additional step of forming said laminate into a composite part prior to curing of said uncured thermosetting resin.

6. A method for making a composite part according to claim 5 wherein said composite part is an aerospace vehicle part.

7. A method for making a laminate according to claim 1 wherein said calendered are open-structured polymeric sheet is from 10 microns to 20 microns thick.

8. A method for making a laminate according to claim 1 wherein said polyamide fibers have a thickness of from 10 microns to 20 microns and wherein said coating of conductive metal is from 0.01 micron to 1.0 micron thick.

9. A method for making a laminate comprising a plurality of electrically conductive fibrous layers and an uncured thermosetting resin wherein said fibrous layers comprise structural conductive fibres and are separated by an interleaf zone located between adjacent fibrous layers, said method providing spacing between said fibrous layers and providing electrical conductance between said fibrous layers across said interleaf zone, said method comprising the steps of:
providing an electrically conductive nonwoven veil comprising polyamide fibers that have been coated with a coating of conductive metal;
compressing said electrically conductive nonwoven veil to form an electrically conductive calendared open-structured polymeric sheet which is from 5 microns to 30 microns thick and weighs from 5 to 20 grams per square meter, said calendared open-structured polymeric sheet having a maximum thickness and a minimum thickness, said nonwoven veil being compressed a sufficient amount to form said calendared open-structured polymeric sheet wherein the difference between said maximum thickness and said minimum thickness is less than 1 micron;
providing a first fibrous layer comprising electrically conductive structural fibres and an uncured thermosetting resin;
locating said calendared open-structured polymeric sheet on said fibrous layer to form a prepreg;
providing a second fibrous layer comprising electrically conductive structural fibres and an uncured thermosetting resin; and
locating said prepreg and second fibrous layers adjacent to each other to form a laminate having an interleaf zone located between said first and second fibrous layers wherein said calendared open-structured polymeric, sheet is located within the interleaf zone, said calendared open-structured polymeric sheet acting as a spacer to provide spacing between said first and second fibrous layers and also providing electrical conductance between said first and second fibrous layers across said interleaf zone.

10. A method for making a laminate according to claim 9 wherein said metal is selected from the group consisting of silver, copper, nickel, gold, platinum, aluminum and mixtures thereof.

11. A method for making a composite part comprising the method according to claim 9 which comprises the additional step of curing said uncured thermosetting resin located in said first and second fibrous layers.

12. A method for making a composite part according to claim 11 wherein a pressure of about 1 atmosphere or less is applied to said prepreg during said curing step of curing said uncured thermosetting resin.

13. A method for making a composite part comprising the method according to claim 11 which includes the additional step of forming said laminate into a portion of said composite part prior to curing of said uncured thermosetting resin.

14. A method far making a composite part according to claim 13 wherein said composite part is an aerospace vehicle part.

15. A method for making a laminate according to claim 9 wherein said calendared open-structured polymeric sheet is from 10 microns to 20 microns thick.

16. A method for making a laminate according to claim 9 wherein said polyamide fibers have a thickness of from 10 microns to 20 microns and wherein said coating of conductive metal is from 0.01 micron to 1.0 micron thick.

* * * * *